US009207398B2

(12) United States Patent
Gibson et al.

(10) Patent No.: US 9,207,398 B2
(45) Date of Patent: Dec. 8, 2015

(54) MULTI-CORE OPTICAL FIBERS FOR IR IMAGE TRANSMISSION

(71) Applicants: Daniel J. Gibson, Cheverly, MD (US); Jasbinder S. Sanghera, Ashburn, VA (US); Leslie Brandon Shaw, Woodbridge, VA (US); Ishwar D. Aggarwal, Charlotte, NC (US)

(72) Inventors: Daniel J. Gibson, Cheverly, MD (US); Jasbinder S. Sanghera, Ashburn, VA (US); Leslie Brandon Shaw, Woodbridge, VA (US); Ishwar D. Aggarwal, Charlotte, NC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 94 days.

(21) Appl. No.: 13/928,633

(22) Filed: Jun. 27, 2013

(65) Prior Publication Data

US 2014/0003776 A1 Jan. 2, 2014

Related U.S. Application Data

(60) Provisional application No. 61/665,446, filed on Jun. 28, 2012.

(51) Int. Cl.
*G02B 6/06* (2006.01)
*C03B 37/012* (2006.01)
*C03B 37/028* (2006.01)
*G02B 6/02* (2006.01)

(52) U.S. Cl.
CPC ............ *G02B 6/06* (2013.01); *C03B 37/01214* (2013.01); *C03B 37/01222* (2013.01); *C03B 37/01288* (2013.01); *C03B 37/028* (2013.01); *G02B 6/02042* (2013.01); *C03B 2201/86* (2013.01); *C03B 2203/04* (2013.01)

(58) Field of Classification Search
CPC ................. G02B 6/02042; G02B 6/06; C03B 27/01214; C03B 27/01222; C03B 27/01288; C03B 27/028; C03B 2201/86; C03B 2203/04
See application file for complete search history.

(56) References Cited

U.S. PATENT DOCUMENTS

| | | | | | |
|---|---|---|---|---|---|
| 2,992,516 | A | * | 7/1961 | Harwood | 65/410 |
| 3,204,326 | A | * | 9/1965 | Granitsas | 29/872 |
| 3,222,520 | A | * | 12/1965 | McNaney | 250/330 |
| 4,652,288 | A | * | 3/1987 | Saito | 65/389 |
| 5,244,636 | A | * | 9/1993 | Walt et al. | 422/82.07 |
| 5,320,814 | A | * | 6/1994 | Walt et al. | 422/82.07 |
| 5,479,550 | A | * | 12/1995 | Nishioka et al. | 385/116 |
| 6,016,376 | A | | 1/2000 | Ghaemi et al. | |
| 6,041,154 | A | * | 3/2000 | Ono et al. | 385/116 |
| 6,175,678 | B1 | * | 1/2001 | Sanghera et al. | 385/116 |

(Continued)

OTHER PUBLICATIONS

Wang et al., "Fabrication and experimental observation of monolithic multi-air-core fiber array for image transmission," Optics Express (2008) vol. 16, No. 11, pp. 7703-7708.

(Continued)

*Primary Examiner* — Rhonda Peace
(74) *Attorney, Agent, or Firm* — US Naval Research Laboratory; Rebecca L. Forman

(57) ABSTRACT

An optical fiber comprising non-silica, specialty glass that has multiple fiber cores arranged in a square registered array. The fiber cores are "registered" meaning that the array location of any fiber core is constant throughout the entire length of the fiber, including both ends. Optical fiber bundles are fabricated by combining multiple multi-core IR fibers with square-registration. Also disclosed is the related method for making the optical fiber.

18 Claims, 8 Drawing Sheets

(56) References Cited

U.S. PATENT DOCUMENTS

| | | | |
|---|---|---|---|
| 6,628,874 B1 * | 9/2003 | Sugawara | 385/127 |
| 6,655,857 B2 * | 12/2003 | Allan | 385/96 |
| 6,813,402 B2 * | 11/2004 | Narita et al. | 385/12 |
| 7,306,344 B2 * | 12/2007 | Abu-Ageel | 359/838 |
| 7,359,603 B2 * | 4/2008 | Large et al. | 385/125 |
| 7,418,835 B2 * | 9/2008 | Nguyen et al. | 65/389 |
| 7,446,315 B1 * | 11/2008 | Tidwell | 250/338.1 |
| 7,519,253 B2 * | 4/2009 | Islam | 385/122 |
| 8,116,606 B2 * | 2/2012 | Sugawara et al. | 385/120 |
| 8,798,422 B2 * | 8/2014 | Messerly et al. | 385/127 |
| 2002/0076178 A1 * | 6/2002 | Klocek et al. | 385/106 |
| 2003/0190130 A1 * | 10/2003 | Welker et al. | 385/126 |
| 2011/0002585 A1 * | 1/2011 | Gibson et al. | 385/43 |
| 2012/0321260 A1 * | 12/2012 | Messerly et al. | 385/123 |
| 2014/0003776 A1 * | 1/2014 | Gibson et al. | 385/116 |

OTHER PUBLICATIONS

Gibson et al., "Transmission properties of hollow glass waveguides," Proc SPIE (1999) vol. 3849, pp. 143-148.

\* cited by examiner

MULTI-CORE OPTICAL FIBERS FOR IR IMAGE TRANSMISSION

PRIORITY CLAIM

This Application claims priority from U.S. Provisional Application No. 61/665,446 filed on Jun. 28, 2012 by Dan Gibson et al., entitled "Multi-Core Optical Fibers for IR Image Transmission," the entire contents of which are incorporated herein by reference.

BACKGROUND OF THE INVENTION

1. Field of the Invention

The present invention relates generally to infrared fiber optics and, more specifically, to infrared sensing and imaging in the 2-12 µm region.

2. Description of the Prior Art

Imaging fibers and fiber bundles have been demonstrated for visible light using silica glass, silicate glasses and polymers and for infrared light using chalcogenide, fluoride and germanate glasses as well as metal-coated hollow waveguides. See, e.g., Gibson et al., "Transmission properties of hollow glass waveguides," Proc. SPIE, vol. 3849, pp. 143 (1999); Wang et al., "Fabrication and experimental observation of monolithic multi-air-core fiber array for image transmission," Opt. Exp., vol. 16, pp. 7703-7708 (2008); Sanghera et al., "Infrared fiber imager," U.S. Pat. No. 6,175,678 B1 (2001); and Saito, "Method of producing infrared image guide," U.S. Pat. No. 4,652,288 (1987), the entire contents of each are incorporated herein by reference.

Fiber bundles are an assembly of individual fibers, where the fibers have a core and at least one cladding, and usually a protective coating. The individual fibers comprising a bundle are fused to each other, through adhesives, thermal bonding, mechanical or other means, at the bundle ends, and non-fused, or separate from each other, in between. Typically the fused length of the bundle is short (<5 cm) relative to the bundle length (1-10 m or more) and the entire bundle is encased in a protective sheath. Oftentimes, the fibers, where they are not fused together, are separated by either air or a lubricating gel for mechanical protection. Fiber bundles can be characterized as coherent, where the individual fibers are spatially registered at both ends for image transfer applications, or incoherent, where the fibers are not intentionally registered for applications where spatial resolution is not important like illumination or power transmission. The most common arrangement of assembly in a fiber bundle is hexagonal packing to maximize the active area of the bundle. Imaging fibers serve a purpose similar to coherent fiber bundles, but are characterized as a single fiber having multiple cores.

BRIEF SUMMARY OF THE INVENTION

The present invention provides an optical fiber comprising non-silica, specialty glass that has multiple fiber cores arranged in a square registered array. The fiber cores are "registered" meaning that the array location of any fiber core is constant throughout the entire length of the fiber, including both ends. Infrared imaging fiber bundles have been fabricated from single-core IR fibers, but this is the first coherent multi-core IR fiber with square-registration for IR imaging. Also disclosed is the related method for making the optical fiber.

The IR imaging fibers described in this disclosure are unique with several novel features. The fibers are coherent and square-registered with consistent inter-core spacing, even across fiber joints when used in fiber bundles. This allows for direct coupling of the imaging fiber to emitter arrays or detector arrays, which also have consistent array pitch. Systems under test using these fibers may couple 1 emitter directly to 1 fiber core, or 1 emitter to 4 cores, etc.

Additionally, the fibers employ a cross-talk reducing inter-core barrier to eliminate cross-talk between cores. Multi-core imaging fibers have an inherent trade-off between throughput and blur (crosstalk). Throughput is maximized when the core is large, but large cores necessitate small inter-core spacing which induces crosstalk. By introducing a very thin barrier in the cladding, between adjacent cores, crosstalk is practically zero in the fibers of the present invention, despite the rather large cores. The thin polymer barrier also serves to protect the outer surface of the fibers, enhancing durability and flexibility for fiber bundles.

The fibers and bundles of the present invention have distinct advantages over the infrared fiber imaging bundle comprised of many individual fibers each having a single core as described in U.S. Pat. No. 6,175,678 to Sanghera et al. The multi-core fibers have a high core packing density, many cores per unit area, which enables high optical throughput and direct 1-to-1 coupling to sensor and emitter arrays. The fibers of the present invention have a polymer film woven into the cladding matrix that permits larger active area (large core diameter to core pitch ratio) by reducing cross-talk. Additionally, the fibers of the present invention can function as modules in larger fiber bundles. Moreover, the method for making the fibers of the present invention is more amenable to square registered arrays than the round outer-shaped fibers described by Sanghera, et al. due to the square outer-shaped preforms and fibers.

These and other features and advantages of the invention, as well as the invention itself, will become better understood by reference to the following detailed description, appended claims, and accompanying drawings.

BRIEF DESCRIPTION OF THE DRAWINGS

FIG. 1(a) shows a general view, and FIG. 1(b) shows a detailed view of the portion of FIG. 1(a) within the dashed lines.

DETAILED DESCRIPTION OF THE INVENTION

The IR imaging fiber of the present invention and the method to make it are novel and have unique features. The fiber is comprised of a non-silica glass, specifically a chalcogenide glass, and more specifically an arsenic sulfide-based glass.

Figure 1:
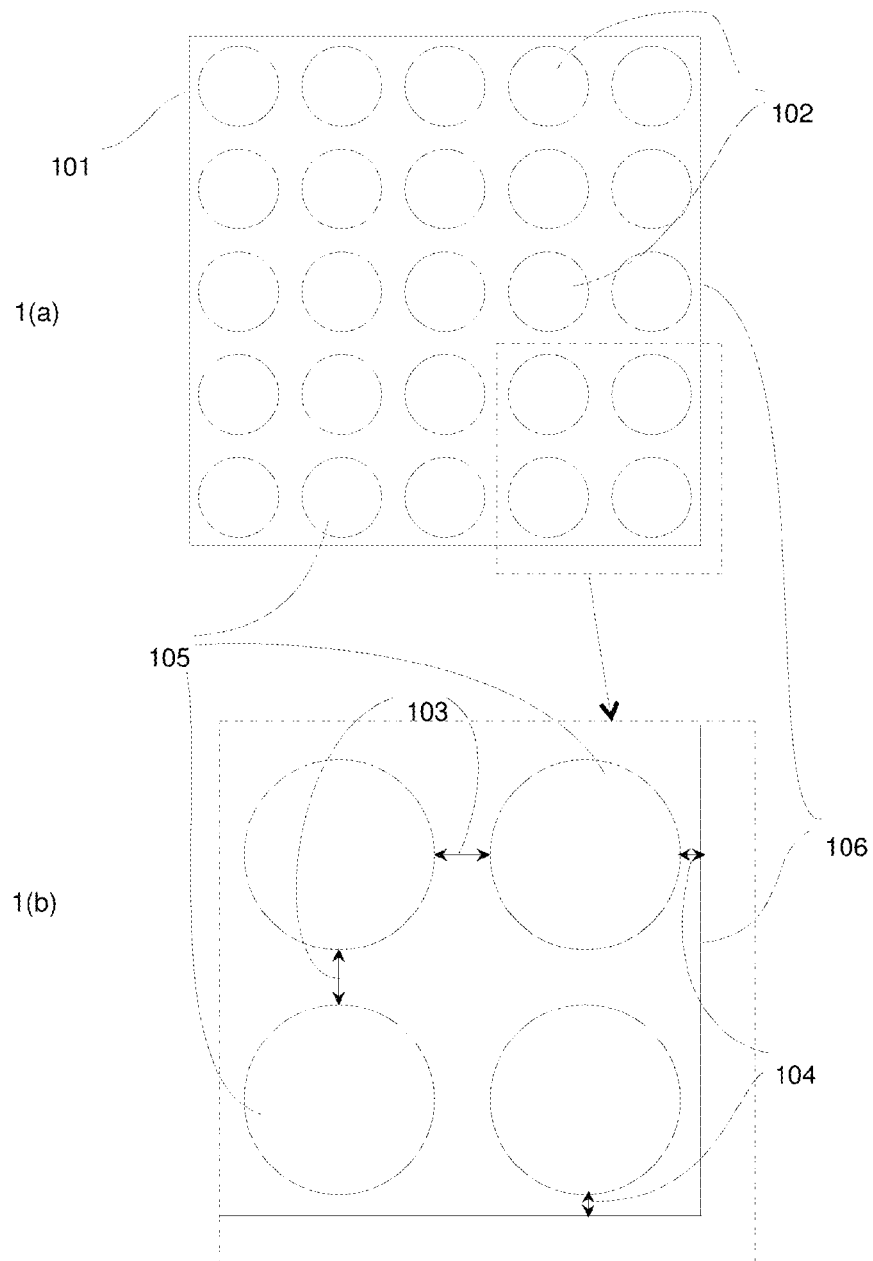
FIG. 1 is a diagram of the cross section of a fiber.

As shown in FIG. 1, the fiber has a square cross sectional shape 101 invariable in shape and dimension along the fiber length. The fiber has multiple fiber cores 102 arranged in a regular rectangular lattice, running the entire length of the fiber. The spacing between any two adjacent cores 103 is constant and double the distance 104 between any core along the fiber perimeter 105 and the outer surface of the fiber 106. The cores 102 may be round, approximately round, square, or some other shape.

Figure 2:
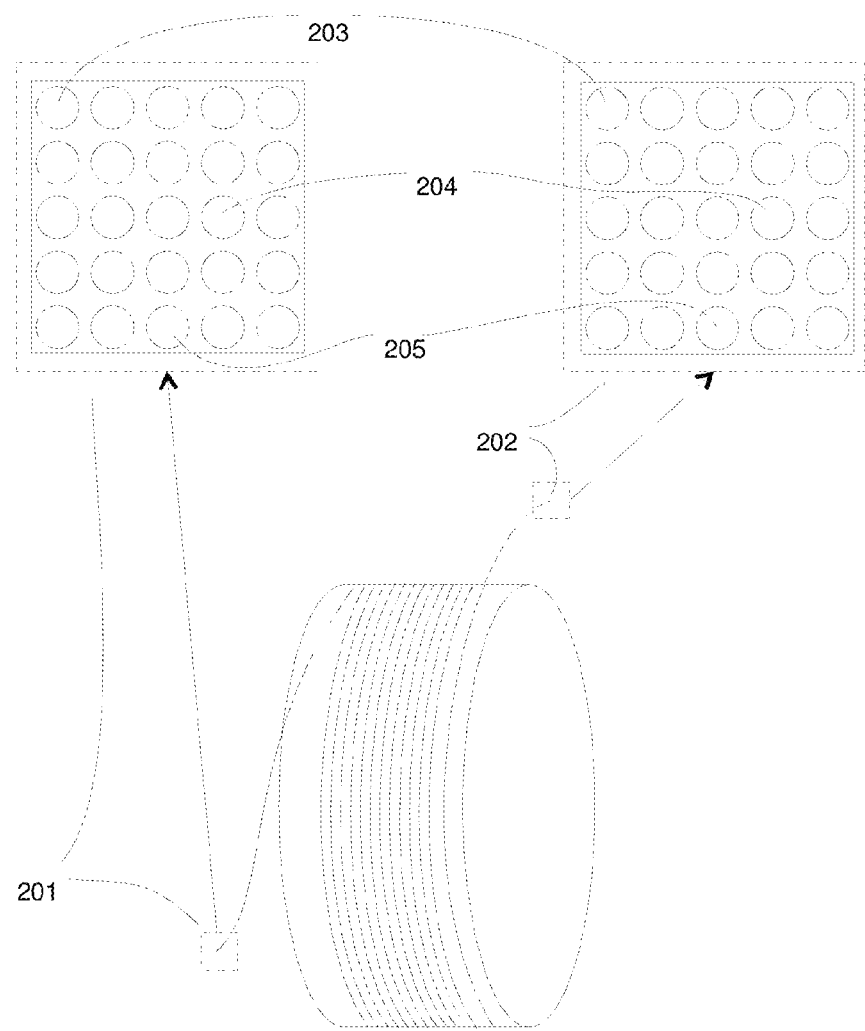
FIG. 2 shows a fiber having a proximal end and a distal end and includes a cross sectional diagram of each end.

As shown in FIG. 2, the fiber has a proximal end 201 and a distal end 202. The cores of the fiber are coherently registered such that each core (e.g. 203, 204, 205) is in the same relative position at the proximal end 201, the distal end 202, and everywhere along the length of the fiber between the ends.

Figure 3:
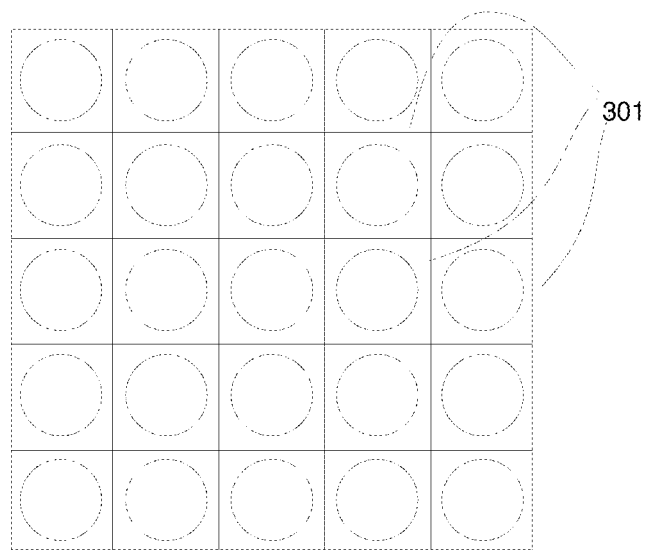
FIG. 3 is a diagram of the cross section of a fiber showing a polymer webbing between each adjacent core and around the outer surface of the fiber.

In some embodiments, the fiber has a polymer webbing 301 between each adjacent core and around the outer surface of the fiber as shown in FIG. 3. This polymer serves to mechanically protect the outer surface and strengthen the fiber. It also reduces cross-talk by absorbing any light leaking from one core thus preventing it from entering another core. In a preferred embodiment, the polymer is polyethersulfone.

Figure 4:
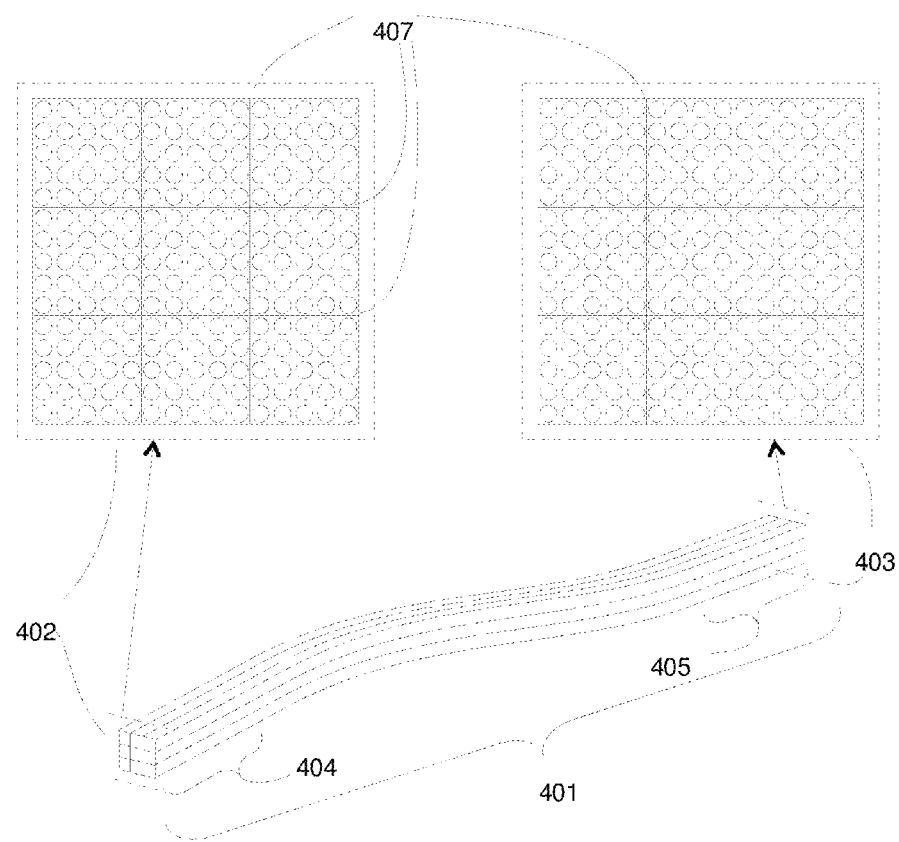
FIG. 4 shows a fiber bundle consisting of nine multi-core square-registered coherent imaging fibers, each comprising 25 cores and includes a cross sectional diagram of each end of the fiber bundle.

As shown in FIG. 4, the imaging fibers of the present invention can function as building blocks for a larger IR imaging fiber bundle 401. The fiber bundle in FIG. 4 consists of nine multi-core square-registered coherent imaging fibers, each comprising 25 cores. The fiber bundle is also square registered and coherent, meaning that the individual fibers are in the same relative spatial position and rotation at the proximal 402 and distal 403 ends. By fusing the imaging fibers over a short length 404, 405 at the ends only, large bundles are possible while maintaining flexibility. Since the inter-core spacing within the fiber 103 is exactly double the core to fiber perimeter distance 104, bundles assembled from this fiber have a consistent inter-core spacing across the entire array, including near the fiber joints 407.

These fibers are fabricated using a multi-step extrusion and preform-draw process. First, cladding tubes with a square outer shape and a single round hole are extruded from an IR transparent glass. The tube width is approximately 10-20 mm and the hole is approximately 8-18 mm in diameter.

Second, a solid, round IR glass core rod is cast, for example in a silica ampoule. The diameter of the core rod (approximately 7.9-17.9 mm) is slightly smaller than the hole of the cladding tube. The glass comprising the core rod has a slightly different composition than the glass comprising the cladding tube, such that it has a larger refractive index. This index contrast determines the numerical aperture of the imaging fiber.

Third, the core rod is inserted into the cladding tube, forming a core-clad preform assembly. At this time, a thin (about 10-100 μm thick) layer of polymer film may be applied to the outer surface of the cladding tube and become a part of the core-clad preform assembly, if it is desired to have a cross-talk reducer in the final fiber. The core-clad preform assembly is now consolidated by fusing the components at an elevated temperature. A self-squaring press may be used during this step to ensure the outer shape of the core-clad preform does not deform, or for correcting the outer shape of an imperfect preform. A vacuum may optionally be used during this step to ensure no gaps at the core-clad interface or the clad-polymer interface.

Fourth, the consolidated core-clad preform is stretched into cane, for example on a fiber optic draw tower, to widths smaller than the preform (around 0.5-2 mm).

Fifth, short lengths (about 4-40 cm) of cane are assembled into a registered preform by stacking them in a squaring press. Care is taken to not impart any twist or crossing among the canes.

Sixth, the registered preform is consolidated by simultaneously heating and pressing the preform. The pressing is best done using a self-squaring press and applying equal force from all 4 sides of the square registered preform. The ends of the preform may be constrained, but pressing on the ends is not required.

Seventh, the consolidated registered preform is drawn on a fiber optic draw tower into a coherent imaging fiber using standard fiber drawing practices. The fiber typically has a width of about 100-1000 μm.

Example 1

Example 1 is a 25-core, square-registered coherent IR imaging fiber and is shown schematically in FIGS. 1 and 2. The individual cores 102 are comprised of As-39%-S-61% glass and are surrounded by a continuous glass cladding matrix comprised of As-38%-S-62% glass. The core diameter is approximately 40 μm. The core pitch, the center-to-center spacing between cores is approximately 50 μm. The fiber width is approximately 250 μm.

Example 2

Example 2 is a 25-core, square-registered coherent IR imaging fiber with cross-talk reducing barrier 301, the cross-section of which is shown schematically in FIG. 3. This barrier is comprised of a polymer film, specifically polyethersulfone (PES) and is approximately 0.5 μm thick. The individual cores are comprised of As-39%-S-61% glass and are surrounded by a cladding comprised of As-38%-S-62% glass. The core diameter is approximately 30 μm. The core pitch is approximately 42 μm. The fiber width is approximately 210 μm.

Example 3

Figure 5A:
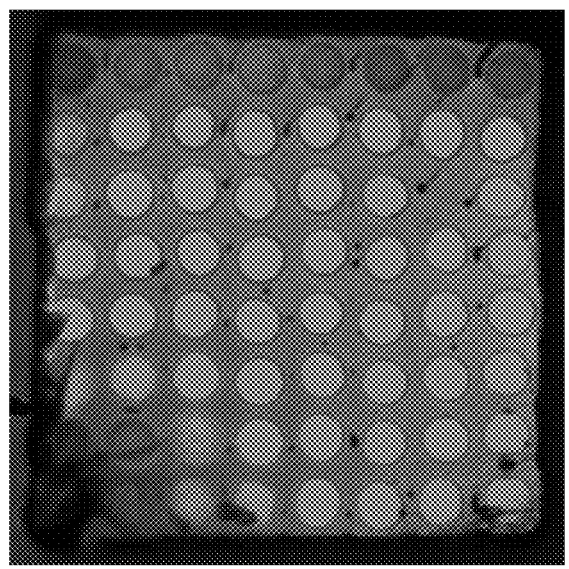
FIG. 5(a) shows an optical micrograph of an illuminated end face of a 64-core, square registered coherent IR imaging fiber.
Figure 5B:
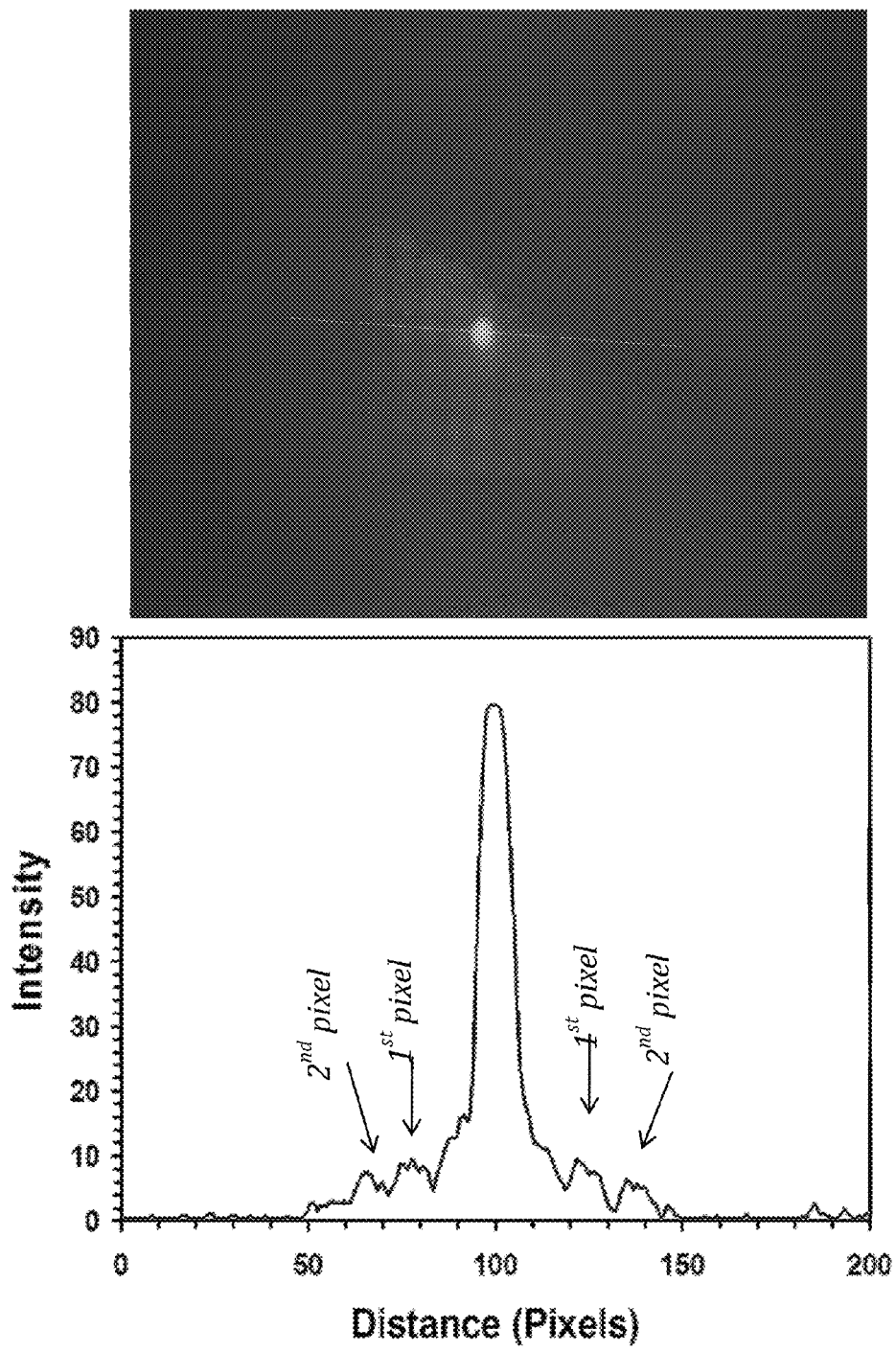
FIG. 5(b) shows the cross-talk for this fiber.

Example 3 is a 64-core, square registered coherent IR imaging fiber, an optical micrograph of an illuminated end face is shown in FIG. 5(a). The cores are comprised of As-39%-S-61% glass and have diameters between 18 μm and 20 μm. The core pitch ranges from 38 μm-40 μm. The cladding is a continuous matrix comprised of As-38%-S-62% glass. The end face of this fiber measures 316 μm×325 μm. The cross-talk for this fiber is shown in FIG. 5(b).

Example 4

Figure 6A:
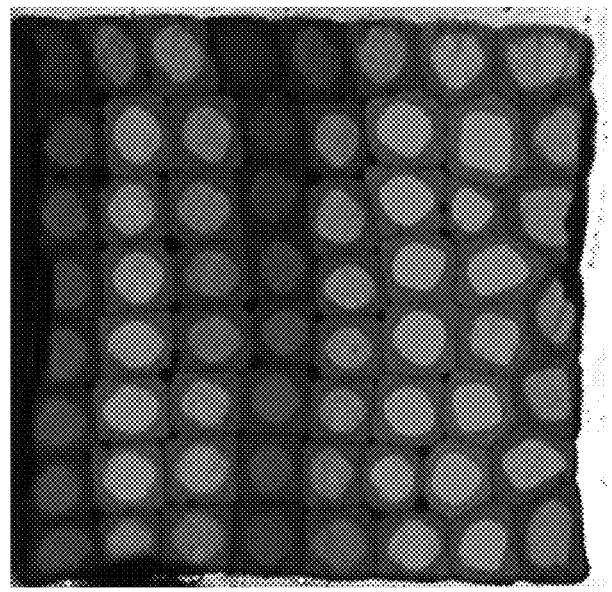
FIG. 6(a) shows an optical micrograph of an illuminated end face of a 64-core, square registered coherent IR imaging fiber with crosstalk reducing barrier.
Figure 6B:
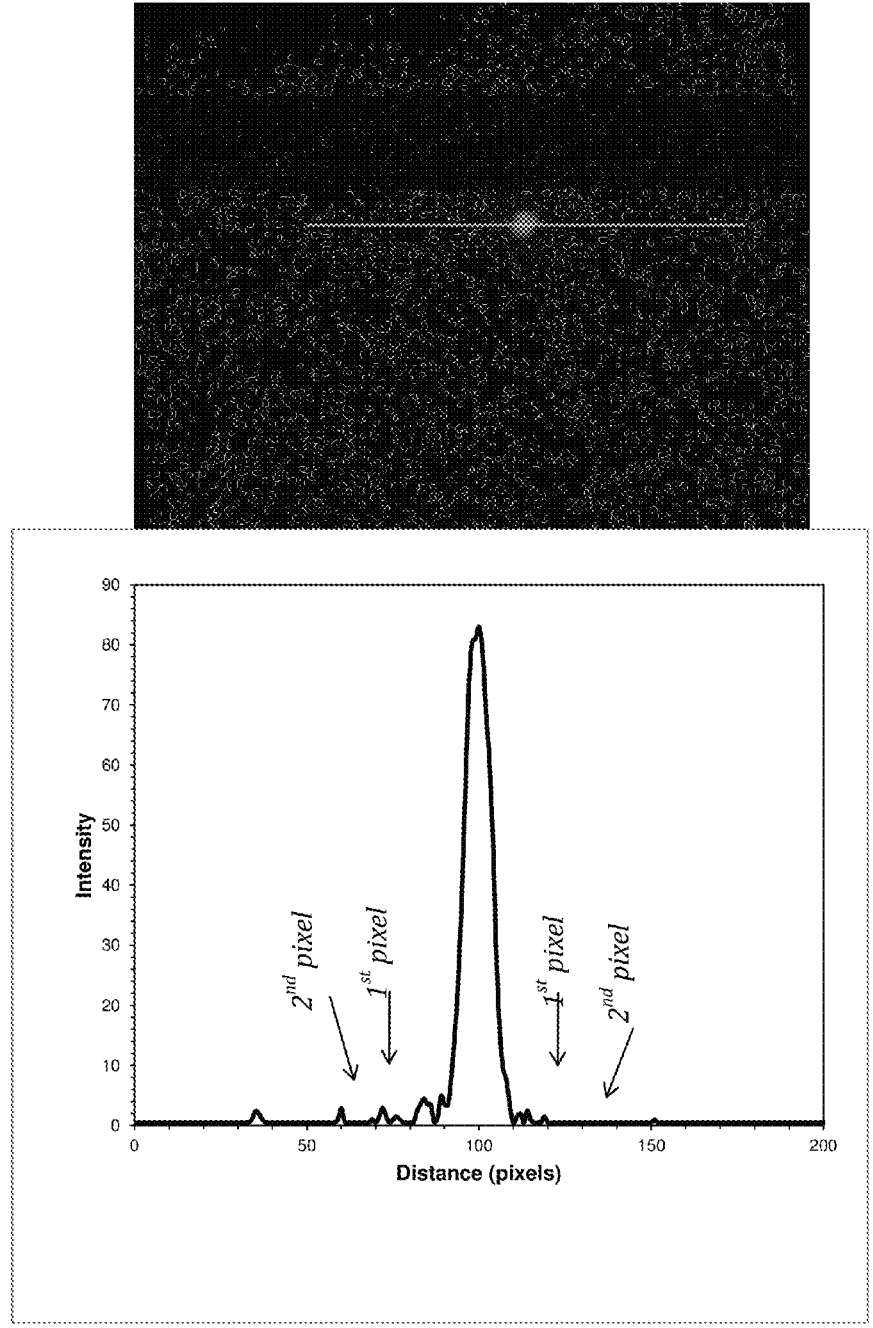
FIG. 6(b) shows the cross-talk for this fiber.

Example 4 is a 64-core, square registered coherent IR imaging fiber with crosstalk reducing barrier, an optical micrograph of an illuminated end face is shown in FIG. 6(a). The diameters of the individual cores measure 18 μm-20 μm, and the core pitch ranges from 38 μm-40 μm. The end face of this fiber measures 316 μm×325 μm. The cross-talk for this fiber is <1% and is shown in FIG. 6(b).

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the

What is claimed as new and desired to be protected by Letters Patent of the United States is:

1. An optical fiber for IR image transmission, comprising:
   a non-silica, specialty glass;
   multiple fiber cores arranged in a square registered array, wherein inter-core spacing is constant; and
   a polymer webbing between each adjacent core and around the perimeter of the array wherein the polymer webbing is a cross-talk reducing barrier that is about 0.5 µm thick.

2. The optical fiber of claim 1, wherein the non-silica, specialty glass is a chalcogenide glass.

3. The optical fiber of claim 1, wherein the non-silica, specialty glass is an arsenic sulfide based glass.

4. The optical fiber of claim 1, wherein the inter-core spacing is double the distance between the fiber perimeter and an outer surface of a core adjacent to the fiber perimeter.

5. The optical fiber of claim 1, wherein the polymer webbing comprises polyethersulfone.

6. An optical fiber bundle for IR image transmission, comprising:
   multiple optical fibers comprising a non-silica, specialty glass; and
   a polymer webbing between each adjacent core and around the perimeter of the bundle, wherein the polymer webbing is a cross-talk reducing barrier that is about 0.5 µm thick;
   wherein each optical fiber comprises multiple fiber cores arranged in a square registered array with consistent inter-core spacing.

7. The optical fiber bundle of claim 6, wherein the non-silica, specialty glass is a chalcogenide glass.

8. The optical fiber bundle of claim 6, wherein the non-silica, specialty glass is an arsenic sulfide based glass.

9. The optical fiber bundle of claim 6, wherein the inter-core spacing is consistent across the entire bundle even between two adjacent fibers.

10. The optical fiber bundle of claim 6, wherein the inter-core spacing is double the distance between the fiber perimeter and an outer surface of a core adjacent to the fiber perimeter.

11. The optical fiber of claim 6, wherein the polymer webbing comprises polyethersulfone.

12. The optical fiber bundle of claim 6, wherein the optical fibers are fused together at a proximal end and at a distal end.

13. A multi-step extrusion and preform-draw method for making an optical fiber for IR image transmission, comprising:
   extruding cladding tubes with a square outer shape and a single round hole from an IR transparent glass;
   then casting a solid, round IR glass core rod, wherein the diameter of the core rod is smaller than the hole of the cladding tube, and wherein the glass comprising the core rod has a different composition than the glass comprising the cladding tube, and wherein the glass comprising the core rod has a larger refractive index than the glass comprising the cladding tube;
   then inserting a core rod into the cladding tube to form a core-clad preform assembly, and consolidating the core-clad preform assembly by fusing the components together;
   then stretching the consolidated core-clad preform into a cane to widths smaller than the preform;
   then assembling lengths of cane into a registered preform by stacking them in a squaring press;
   then consolidating the registered preform by simultaneously heating and pressing the preform; and
   then drawing the consolidated registered preform into an imaging fiber.

14. The method of claim 13, wherein the core rod comprises As-39%-S-61% glass and the cladding tube comprises As-38%-S-62% glass.

15. The method of claim 13, wherein the polymer comprises polyethersulfone.

16. A multi-step extrusion and preform-draw method for making an optical fiber for IR image transmission, comprising:
   extruding cladding tubes with a square outer shape and a single round hole from an IR transparent glass;
   then casting a solid, round IR glass core rod, wherein the diameter of the core rod is smaller than the hole of the cladding tube, and wherein the glass comprising the core rod has a different composition than the glass comprising the cladding tube, and wherein the glass comprising the core rod has a larger refractive index than the glass comprising the cladding tube;
   then inserting a core rod into the cladding tube to form a core-clad preform assembly, applying a layer of polymer film to the outer surface of the cladding tube, and consolidating the core-clad preform assembly by fusing the components together;
   then stretching the consolidated core-clad preform into a cane to widths smaller than the preform;
   then assembling lengths of cane into a registered preform by stacking them in a squaring press;
   then consolidating the registered preform by simultaneously heating and pressing the preform; and
   then drawing the consolidated registered preform into an imaging fiber.

17. The method of claim 16, wherein the core rod comprises As-39%-S-61% glass and the cladding tube comprises As-38%-S-62% glass.

18. The method of claim 16, wherein the polymer comprises polyethersulfone.

* * * * *